(12) United States Patent
Honma et al.

(10) Patent No.: US 7,171,456 B2
(45) Date of Patent: Jan. 30, 2007

(54) DOCUMENT DATA TRANSMISSION DEVICE, DOCUMENT DATA TRANSMISSION RECEPTION SYSTEM, AND DOCUMENT DATA TRANSMISSION METHOD

(75) Inventors: Susumu Honma, Minato-ku (JP); Hidetoshi Osafune, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 911 days.

(21) Appl. No.: 09/866,805

(22) Filed: May 30, 2001

(65) Prior Publication Data

US 2002/0143863 A1    Oct. 3, 2002

(30) Foreign Application Priority Data

May 31, 2000   (JP)   ............... 2000-162933

(51) Int. Cl.
*G06F 15/16*   (2006.01)
(52) U.S. Cl. ............... 709/219; 715/907; 715/911
(58) Field of Classification Search ............... 709/201, 709/202, 203, 219, 231; 704/9; 455/12.1; 715/531, 513, 523, 800, 848, 514, 515, 713, 715/739, 907, 911; 380/246; 379/100.08; 707/1, 3, 4
See application file for complete search history.

(56) References Cited

U.S. PATENT DOCUMENTS

| | | | | |
|---|---|---|---|---|
| 4,450,477 A | * | 5/1984 | Lovett | 725/93 |
| 4,571,700 A | * | 2/1986 | Emry et al. | 707/101 |
| 5,191,611 A | * | 3/1993 | Lang | 705/53 |
| 5,224,156 A | * | 6/1993 | Fuller et al. | 379/100.08 |
| 5,819,301 A | * | 10/1998 | Rowe et al. | 715/513 |
| 6,044,405 A | * | 3/2000 | Driscoll et al. | 709/232 |
| 6,167,370 A | * | 12/2000 | Tsourikov et al. | 704/9 |
| 6,188,766 B1 | * | 2/2001 | Kocher | 380/246 |
| 6,301,584 B1 | * | 10/2001 | Ranger | 707/103 R |
| 6,421,716 B1 | * | 7/2002 | Eldridge et al. | 709/219 |
| 6,449,639 B1 | * | 9/2002 | Blumberg | 709/217 |
| 6,452,689 B1 | * | 9/2002 | Srinivasan | 358/1.15 |
| 6,460,076 B1 | * | 10/2002 | Srinivasan | 709/219 |
| 6,490,579 B1 | * | 12/2002 | Gao et al. | 707/4 |
| 6,687,878 B1 | * | 2/2004 | Eintracht et al. | 715/512 |
| 6,697,850 B1 | * | 2/2004 | Saunders | 709/219 |
| 6,775,519 B1 | * | 8/2004 | Wiedeman et al. | 455/12.1 |
| 6,826,553 B1 | * | 11/2004 | DaCosta et al. | 707/1 |
| 6,836,768 B1 | * | 12/2004 | Hirsch | 707/3 |
| 6,839,701 B1 | * | 1/2005 | Baer et al. | 707/3 |
| 6,924,828 B1 | * | 8/2005 | Hirsch | 715/800 |
| 2002/0126321 A1 | * | 9/2002 | Trachtman | 358/407 |

* cited by examiner

*Primary Examiner*—Saleh Najjar
*Assistant Examiner*—V. Korobov
(74) *Attorney, Agent, or Firm*—Oliff & Berridge, PLC

(57) ABSTRACT

The invention provides a document data transmission device to swiftly transmit information that a user needs. The document data transmission device includes a storage unit that stores plural document data pieces and plural summary data pieces including contents information, a page data transmission request receiving unit that receives a page data transmission request transmitted from a user terminal, a page data transmitting unit that transmits specific page data of specific document data to the user terminal through a satellite network on the basis of the page data transmission request, a summary data transmission request receiving unit that receives a summary data transmission request transmitted from the user terminal, and a summary data transmitting unit that transmits specific summary data to the user terminal, on the basis of the summary data transmission request.

11 Claims, 6 Drawing Sheets

FIG.2B

| | | 16b |
|---|---|---|
| VERSION | 1 | |
| PATENT NUMBER | NO. 1000000 | |
| DATE OF REGISTRATION | JAN. 1, 2000 | |
| DATE OF ISSUE | MAR. 1, 2000 | |
| YEAR OF FILING | 1998 | |
| APPLICATION NUMBER | PATENT APPLICATION NO. HEI 10-1000000 | |
| FILING DATE | JAN. 10, 1998 | |
| PRIORITY DATE | JAN. 20, 1997 | |
| YEAR OF UNEXAMINED PUBLICATION | 1998 | |
| UNEXAMINED PUBLICATION NUMBER | UNEXAMINED PATENT APPLICATION NO. HEI 10-1000000 | |
| DATE OF PUBLICATION | JUL. 30, 1998 | |
| IPC | H02K 1/27 501 | |
| FI | H01L 21-265 603A | |
| APPLICANT | A ELECTRIC CORP. | |
| TITLE OF THE INVENTION | DATA STORAGE SYSTEM | |
| NUMBER OF CLAIMS | 18 | |
| TOTAL NUMBER OF PAGES | 11 | |
| TITLE OF THE INVENTION | 1 | |
| DIVISION/CONVERSION INFORMATION | 1 | |
| INTERNATIONAL APPLICATION INFORMATION | 1 | |
| APPEAL/TRIAL INFORMATION | 1 | |
| PRIORITY RIGHT INFORMATION | 1 | |
| APPLICANT | 1 | |
| INVENTOR | 1 | |
| ATTORNEY | 1 | |
| CLAIMS | 1~2 | |
| CLAIM 1 | 1 | |
| INFORMATION OF CONTENTS — DETAILED DESCRIPTION OF THE INVENTION | 3~9 | |
| RELEVANT TECHNICAL FIELD | 3 | |
| PRIOR ART | 3 | |
| PROBLEMS TO BE SOLVED BY THE INVENTION | 3~4 | |
| MEANS TO SOLVE THE PROBLEMS | 4 | |
| OPERATION | 4~9 | |
| EMBODIMENTS | 9 | |
| EFFECTS OF THE INVENTION | 9~10 | |
| BRIEF DESCRIPTION OF THE DRAWINGS | 10~11 | |
| DRAWINGS | | |

*FIG.3*

| CLIENT ID | SUMMARY DATA TRANSMISSION DATA QUANTITY (UNIT DATA QUANTITY) | SUMMARY DATA UNIT BILLING PRICE (YEN/UNIT DATA QUANTITY) | PAGE DATA TRANSMISSION DATA QUANTITY (UNIT DATA QUANTITY) | PAGE DATA UNIT BILLING PRICE (YEN/UNIT DATA QUANTITY) | BILLING AMOUNT (YEN) |
|---|---|---|---|---|---|
| 1 | 20 | 20 | 45 | 200 | 9400 |
| 2 | 17 | 20 | 28 | 200 | 5940 |
| 3 | 45 | 20 | 68 | 200 | 14500 |
| 4 | 21 | 20 | 33 | 200 | 7020 |
| 5 | 32 | 20 | 52 | 200 | 11040 |
| 6 | 6 | 20 | 15 | 200 | 3120 |

16c

DOCUMENT DATA TRANSMISSION DEVICE, DOCUMENT DATA TRANSMISSION RECEPTION SYSTEM, AND DOCUMENT DATA TRANSMISSION METHOD

BACKGROUND OF THE INVENTION

1. Field of the Invention

The present invention relates to a document data transmission device, document data transmission reception system, and document data transmission method that transmit document data to a client in accordance with a transmission request from the client or the like.

2. Description of the Related Art

A document data transmission device (document data transmission device) has generally been known which transmits document data to a client in accordance with a transmission request from the client. This type of document data transmission device stores plural document data pieces (patent publications, for example) in a storage unit, and transmits a specific document data that a client requests to send to the client. Normally, this type of document data transmission device receives the transmission request of the specific document data from the client through the Internet, and transmits the specific document data to the client through the Internet. Receiving a transmission request and sending document data through the Internet that is already organized as the information and communication infrastructure, a document data transmission service provider is able to perform a document data transmission service using a document data transmission device, with a small initial investment.

However, this type of document data transmission device according to the conventional technique involves the following problems.

First, this type of document data transmission device according to the conventional technique transmits to the client the whole of the specific document data requested by a client, regardless of whether the client needs the whole of the specific document data or not. Accordingly, when the client needs only a part of the specific document data, more concretely, when the client needs only the page data of page 99 of the document data made up of 100 pages, for example, it takes the client a long time to procure the necessary information.

Further, this type of document data transmission device according to the conventional technique receives a transmission request and transmits the document data through the Internet. Here in this system, generally the data quantity of the transmission request is extremely small, and usually the communication time for the transmission request performed through the Internet is insignificantly short. On the other hand, however, the data quantity of the document data can be extremely large, and in such a case, the time for transmitting the document data through the Internet can be very long.

Thus, this type of document data transmission device according to the conventional technique is not able to swiftly transmit the information needed by a client, in the transmission of the document data.

SUMMARY OF THE INVENTION

The present invention has been made in view of the above circumstances and provides a document data transmission device capable of swiftly transmitting an information that a client needs, a document data transmission system using the document data transmission device, and a document data transmission method using the same.

In accordance with an aspect of the invention, the document data transmission device is provided with a storage unit that stores plural document data pieces including one or plural page data pieces, a page data transmission request receiving unit that receives a page data transmission request transmitted from a user terminal, requesting to transmit specific page data contained in specific document data selected among the plural document data pieces stored in the storage unit, and a page data transmitting unit that transmits the specific page data contained in the specific document data to the user terminal through a satellite network, on the basis of the page data transmission request received by the page data transmission request receiving unit.

The document data transmission device receives a page data transmission request transmitted from a user terminal, requesting the transmission of specific page data contained in specific document data, and transmits the specific page data to the user terminal, so that in comparison with transmitting the whole document data to the user terminal, the document data transmission device can efficiently transmit the specific page data that the client (user of the user terminal) needs to the user terminal. Further, since the document data transmission device transmits the specific page data to the user terminal through a satellite network, in comparison with transmitting the specific page data to the user terminal through the Internet, the document data transmission device can transmit the specific page data to the user terminal in a short time.

In accordance with another aspect of the invention, preferably the storage unit stores plural summary data pieces including contents information of each of the plural document data pieces, and the document data transmission device is further provided with a summary data transmission request receiving unit that receives a summary data transmission request transmitted from the user terminal, requesting to transmit specific summary data selected among the plural summary data pieces stored in the storage unit, and a summary data transmitting unit that transmits the specific summary data to the user terminal, on the basis of the summary data transmission request received by the summary data transmission request receiving unit.

The document data transmission device receives a summary data transmission request requesting to transmit specific summary data, transmitted from the user terminal, and transmits the specific summary data to the user terminal, whereby the document data transmission device is able to inform the client (user of the user terminal) as to which part (which page) of the specific document data contains the specific page data.

In accordance with another aspect of the invention, preferably the document data transmission device is further provided with a billing amount calculating unit that calculates a billing amount charged to the transmission of the page data and to the transmission of the summary data, on the basis of a unit page data billing price charged to the transmission of a unit data quantity of the page data and a unit summary data billing price charged to a transmission of a unit data quantity of the summary data.

Since the billing amount is calculated on the basis of a unit page data billing price and a unit summary data billing price, when compared with setting a uniform unit billing price regardless of the transmission of a page data or the transmission of a summary data, a more flexible billing system can be organized, for example, a system such that the unit summary data billing price can be set low in comparison with the unit page data billing price.

And, in accordance with another aspect of the invention, the document data transmission reception system is provided with a document data transmission device and a user terminal that transmits a page data transmission request requesting to transmit the specific page data to the document data transmission device, and receives the specific page data transmitted from the document data transmission device through a satellite network.

With the document data transmission device and the user terminal, the document data transmission reception system is able to transmit the specific page data that the client (user of the user terminal) needs to the user terminal with efficiency in a short time.

Further, in accordance with another aspect of the invention, preferably the document data transmission reception system is provided with a document data transmission device and a user terminal that transmits a summary data transmission request requesting to transmit the specific summary data to the document data transmission device, and receives the specific summary data transmitted from the document data transmission device.

With the document data transmission device and the user terminal, the document data transmission reception system is able to inform the client (user of the user terminal) as to which part (which page) of the specific document data contains the specific page data.

And, in accordance with another aspect of the invention, the document data transmission method is a method of transmitting document data from a document data transmission device having a storage unit that stores plural document data pieces including one or plural page data pieces, which includes a page data transmission request receiving step of receiving a page data transmission request transmitted from a user terminal, requesting to transmit specific page data contained in specific document data selected among the plural document data pieces stored in the storage unit, and a page data transmitting step of transmitting the specific page data contained in the specific document data to the user terminal through a satellite network, on the basis of the page data transmission request received in the page data transmission request receiving step.

In the document data transmission method, since the method includes the step of receiving a page data transmission request transmitted from a user terminal, requesting the transmission of specific page data contained in specific document data, and the step of transmitting the specific page data to the user terminal, whereby, when compared with transmitting the whole document data to the user terminal, the method can efficiently transmit the specific page data that the client (user of the user terminal) needs to the user terminal. Further, since the method include the step of transmitting the specific page data to the user terminal through a satellite network, when compared with transmitting the specific page data to the user terminal through the Internet, the method can transmit the specific page data to the user terminal in a short time.

Further, in accordance with another aspect of the invention, in the document data transmission method, preferably, the storage unit stores plural summary data pieces including contents information of each of the plural document data pieces, and the method further includes a summary data transmission request receiving step of receiving a summary data transmission request transmitted from the user terminal, requesting to transmit specific summary data selected among the plural summary data pieces stored in the storage unit, and a summary data transmitting step of transmitting the specific summary data to the user terminal, on the basis of the summary data transmission request received in the summary data transmission request receiving step.

The document data transmission method includes the step of receiving a summary data transmission request requesting to transmit specific summary data, transmitted from the user terminal, and the step of transmitting the specific summary data to the user terminal, whereby the method is able to inform the client (user of the user terminal) as to which part (which page) of the specific document data contains the specific page data.

Further, in accordance with another aspect of the invention, preferably the document data transmission method further includes a billing amount calculating step of calculating a billing amount charged to the transmission of the page data and to the transmission of the summary data, on the basis of a unit page data billing price charged to the transmission of a unit data quantity of the page data and a unit summary data billing price charged to a transmission of a unit data quantity of the summary data.

Since the method calculates the billing amount on the basis of a unit page data billing price and a unit summary data billing price, when compared with setting a uniform unit billing price regardless of the transmission of a page data or the transmission of a summary data, the method is able to organize a more flexible billing system, for example, a system to set the unit summary data billing price low in comparison with the unit page data billing price.

BRIEF DESCRIPTION OF THE DRAWINGS

Preferred embodiment of the present invention will be described in detail based on the followings, wherein:

FIG. 3 is a chart illustrating a configuration of a billing information database;

DETAILED DESCRIPTION OF THE PREFERRED EMBODIMENTS

The preferred embodiment of the document data transmission reception system according to the invention will be described with reference to the accompanying drawings. The document data transmission reception system relating to the embodiment includes the document data transmission device according to the invention.

Figure 1:
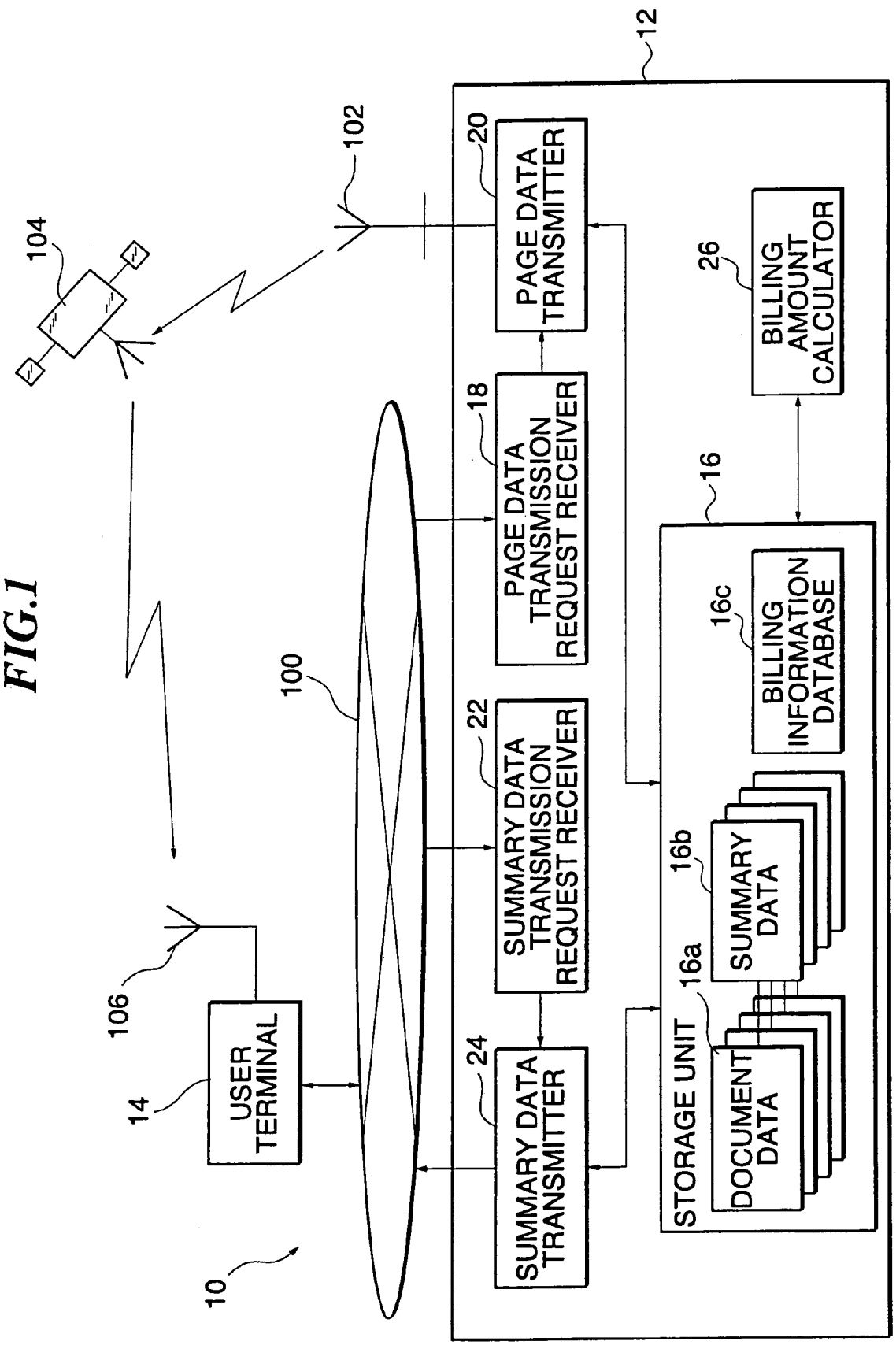
FIG. 1 is a block diagram of a document data transmission reception system.

First, the configuration of the document data transmission reception system relating to the embodiment will be described. FIG. 1 is a block diagram of the document data transmission reception system relating to the embodiment.

A document data transmission reception system 10 relating to the embodiment is the document data transmission reception system that handles, for example, the patent publications (electronic data) as document data, which includes a document data transmission device 12 and a user terminal 14 connected to the document data transmission device 12 through a network 100 (the Internet, for example). Here, the user terminal 14 connected to the document data transmission device 12 is not limited to one in general, and one or plural terminals are provided for each client; however in this description, only one user terminal 14 is assumed to be connected to the document data transmission device 12 to simplify the explanation. Incidentally, the document data transmission device 12 and the user terminal 14 are made up with a computer system including an input device such as a keyboard and a mouse, a display device such as a monitor display, a storage device such as a hard disc drive, a transmission reception device such as a modem, a memory, and a CPU (Central Processing Unit).

The document data transmission device 12 includes a storage unit 16, a page data transmission request receiving unit 18, page data transmitting unit 20, a summary data transmission request receiving unit 22, a summary data transmitting unit 24, a billing amount calculating unit 26. The components of the document data transmission device 12 and the user terminal 14 will now be described in detail.

Figure 2A:
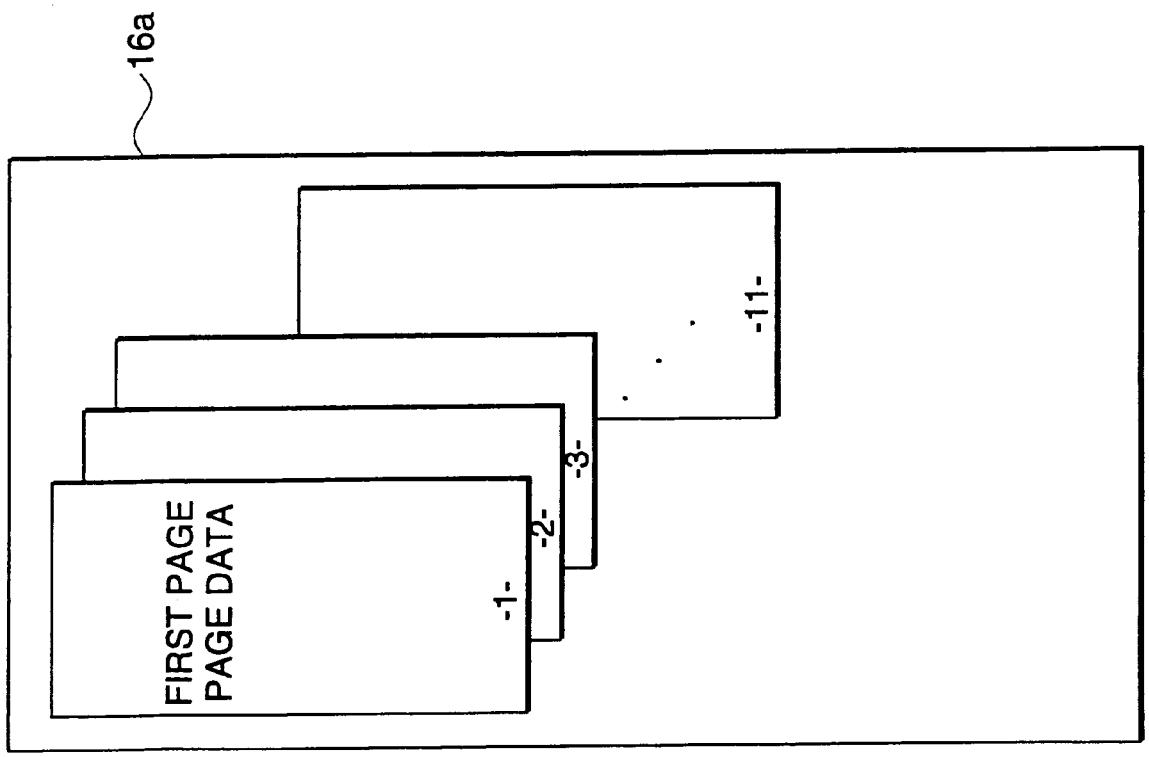
FIG. 2 is a chart illustrating a configuration of document data and summary data.

The storage unit 16 of the document data transmission device 12 stores plural document data pieces 16a containing one or plural page data pieces, plural summary data pieces 16b containing contents information of each of the plural document data pieces, and a billing information database 16c. FIG. 2 illustrates a configuration of the document data pieces 16a and the summary data pieces 16b, and FIG. 3 illustrates a configuration of the billing information database 16c.

As shown in FIG. 2, the plural document data pieces 16a contain one or plural page data pieces (11 page data, in FIG. 2). Here, the page data pieces are the data pieces contained in each page, when document data is divided into a unit of page. The page here signifies a division unit of document data in a broad sense. It may be a sheet of the recording pager, when the document data is printed out on recording papers. Or, it may be a screen of the display, when the document data is displayed on a display screen. And, the document data may be configured with the character information only, or it may be mixed with character information and picture information. And, the character information may be text data, or it may be picture data containing the character information.

The summary data pieces 16b are made one by one in correspondence with each of the plural document data pieces 16a (namely, the number of the summary data pieces 16b is equal to the number of the document data pieces 16a). The summary data pieces 16b contain the contents information of the corresponding document data pieces 16a. If the document data pieces 16a are the patent publications as shown in FIG. 2, more concretely, the summary data pieces 16b contain a version, patent number, date of registration, date of issue, year of filing, application number, filing date, priority date, year of unexamined publication, unexamined publication number, date of unexamined publication, IPC, FI, applicant, title of the invention, number of claims, total number of pages, and contents information. Here, the contents information is an information showing that which page contains what contents of information. The contents information as shown in FIG. 2 shows that the title of the invention is contained in the first page, the information on division/conversion in the first page, the information on international application in the first page, the appeal/trial information in the first page, the priority right information in the first page, the applicant in the first page, the inventor in the first page, the attorney in the first page, the claims in the first to second pages, claim 1 in the first page, the detailed description of the invention in the third to ninth pages, the relevant technical field in the third page, the prior art in the third page, the problems to be solved by the invention in the third page, the means to solve the problems in the third to fourth pages, the operation in the fourth page, the embodiments in the fourth to ninth pages, the effects of the invention in the ninth page, the brief description of the drawings in the ninth to tenth pages, and the drawings in the tenth to eleventh pages.

The billing amount database 16c contains information relating to billing amounts to each of the plural clients, as shown in FIG. 3. More concretely, the billing amount database 16c contains a client ID for identifying a client, summary data transmission data quantity to each client, unit summary data billing price charged to the transmission of unit data quantity of summary data, page data transmission data quantity to each client, unit page data billing price charged to the transmission of unit data quantity of page data, and total billing amount charged to the transmission of page data and the transmission of summary data to each client. Here, the unit summary data billing price is different in setting from the unit page data billing price, more concretely, the unit summary data billing price is set extremely low compared to the unit page data billing price.

The page data transmission request receiving unit 18 receives a page data transmission request transmitted from the user terminal 14, requesting to transmit specific page data contained in specific document data selected among the plural document data pieces 16a stored in the storage unit 16. More in detail, the page data transmission request receiving unit 18 receives a page data transmission request transmitted from the user terminal 14 through the network 100. The page data transmission request contains information for identifying the specific document data (name of the document data, or ID of the document data, for example), and information for identifying the specific page data pieces (page number, for example). The specific document data and the specific page data pieces may be one or plural.

The page data transmitting unit 20 transmits the specific page data contained in the specific document data to the user terminal 14 through a satellite network, on the basis of the page data transmission request received by the page data transmission request receiving unit 18. More concretely, first, the page data transmitting unit 20 looks up the information for identifying the specific document data and the information for identifying the specific page data which are contained in the page data transmission request received by the page data transmission request receiving unit 18, and extracts the specific page data contained in the specific document data among the plural document data pieces 16a stored in the storage unit 16. The page data transmitting unit 20 transmits the specific page data contained in the specific document data extracted to the user terminal 14 through a satellite network, using a parabolic antenna 102 connected to the page data transmitting unit 20 and a communication satellite 104.

The summary data transmission request receiving unit 22 receives a summary data transmission request transmitted from the user terminal 14, requesting to transmit specific summary data selected among the plural summary data pieces 16b stored in the storage unit 16. More concretely, the summary data transmission request receiving unit 22 receives a summary data transmission request transmitted from the user terminal 14 through the network 100. The summary data transmission request contains an information for identifying the specific summary data (name of the summary data, ID of the summary data, name of the corresponding document data, or ID of the corresponding document data, for example). The specific summary data pieces may be one or plural.

The summary data transmitting unit 24 transmits the specific summary data to the user terminal 14, on the basis of the summary data transmission request received by the summary data transmission request receiving unit 22. More concretely, first, the summary data transmitting unit 24 looks up the information for identifying the specific summary data contained in the summary data transmission request received by the summary data transmission request receiving unit 22, and extracts the specific summary data among the plural summary data pieces 16b stored in the storage unit 16. The summary data transmitting unit 24 transmits the specific summary data extracted to the user terminal 14 through the network 100.

The billing amount calculating unit 26 calculates a total billing amount charged to the transmission of the page data and to the transmission of the summary data, on the basis of the unit page data billing price charged to the transmission of the unit data quantity of the page data and the unit summary data billing price charged to the transmission of the unit data quantity of the summary data. Concretely, the billing amount calculating unit 26 calculates a total billing amount charged to the transmission of the page data and to the transmission of the summary data, by adding a product of the page data transmission data quantity multiplied by the unit page data billing price to a product of the summary data transmission data quantity multiplied by the unit summary data billing price. More concretely, when page data is transmitted from the page data transmitting unit 20 to the user terminal 14, the billing amount calculating unit 26 updates (calculates) a total billing amount charged to the transmission of the page data and to the transmission of the summary data in regard to the client, using the unit page data billing price contained in the billing information database 16c stored in the storage unit 16. And, when a summary data is transmitted from the summary data transmitting unit 24 to the user terminal 14, the billing amount calculating unit 26 updates (calculates) a total billing amount charged to the transmission of the page data and to the transmission of the summary data in regard to the client, using the unit summary data billing price contained in the billing information database 16c stored in the storage unit 16. Incidentally, the billing amount calculating unit 26 may calculate the billing amount based on the frequency of transmission of the summary data, assuming that the data quantities of the plural summary data pieces each are substantially equal. In the same manner, the billing amount calculating unit 26 may calculate the billing amount based on the frequency of transmission of the page data, assuming that the data quantities of the plural page data pieces each are substantially equal.

The user terminal 14 transmits the page data transmission request requesting to transmit the specific page data to the document data transmission device 12. More concretely, the user terminal 14 transmits the page data transmission request through the network 100 to the page data transmission request receiving unit 18 of the document data transmission device 12. The page data transmission request contains information for identifying the specific document data (name of the document data, or ID of the document data, for example) and information for identifying the specific page data (page number, for example). The specific document data pieces and the specific page data pieces may be one or plural.

The user terminal 14 receives the specific page data transmitted from the document data transmission device 12 through a satellite network. More concretely, the user terminal 14, using a parabolic antenna 106 connected to the user terminal 14, receives the specific page data transmitted through a satellite network from the page data transmitting unit 20 of the document data transmission device 12.

Further, the user terminal 14 transmits the summary data transmission request requesting to transmit the specific summary data to the document data transmission device 12. More concretely, the user terminal 14 transmits the summary data transmission request through the network 100 to the summary data transmission request receiving unit 22 of the document data transmission device 12. The page data transmission request contains an information for identifying the specific summary data (name of the summary data, ID of the summary data, name of the corresponding document data, or ID of the corresponding document data, for example). The specific summary data pieces may be one or plural.

Further, the user terminal 14 receives the specific summary data transmitted from the document data transmission device 12. More concretely, the user terminal 14 receives the specific summary data transmitted through the network 100 from the summary data transmitting unit 24 of the document data transmission device 12.

Figure 4:
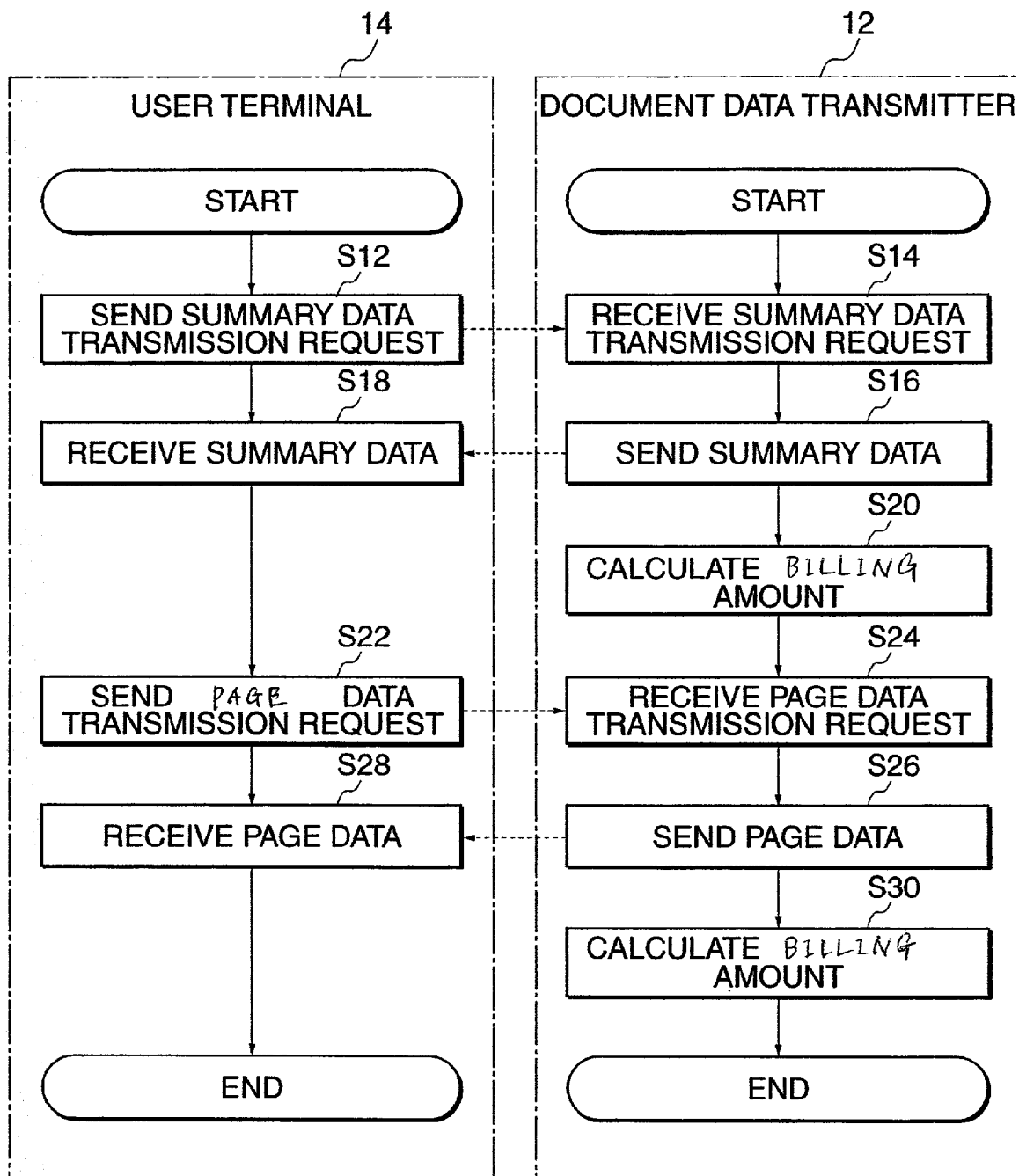
FIG. 4 is a flowchart illustrating an operation of the document data transmission reception system.

Next, the operation of the document data transmission reception system relating to the embodiment will be described, and the document data transmission method according to the invention will be described as well. FIG. 4 is a flowchart illustrating the operation of the document data transmission reception system 10.

In order that a client (user of the user terminal 14) receives document data (patent publications in this case), using the document data transmission reception system 10, first, the client (user of the user terminal 14) inputs a summary data transmission request to the user terminal 14, which requests to transmit the specific summary data selected among the plural summary data pieces 16b stored in the storage unit 16 of the document data transmission device 12. More concretely, the client (user of the user terminal 14) inputs, as the summary data transmission request, an information for identifying the specific summary data (name of the summary data, ID of the summary data, name of the corresponding document data, or ID of the corresponding document data, for example) to the user terminal 14. Here, the specific summary data pieces may be one or plural.

The summary data transmission request inputted to the user terminal 14 is transmitted from the user terminal 14 through the network 100 (S12), and received by the summary data transmission receiving unit 22 of the document data transmission device 12 (S14).

When the summary data transmission request is received by the summary data transmission receiving unit 22 of the document data transmission device 12, on the basis of the summary data transmission request received by the summary data transmission receiving unit 22 of the document data transmission device 12, the specific summary data is transmitted by the summary data transmitting unit 24 of the document data transmission device 12 (S16), and is received by the user terminal 14 (S18). More concretely, first, the information for identifying the specific summary data is looked up which is contained in the summary data transmission request received by the summary data transmission receiving unit 22 of the document data transmission device 12, and the specific summary data is extracted among the plural summary data pieces 16b stored in the storage unit 16 of the document data transmission device 12. Next, the specific summary data extracted is transmitted through the network 100 from the summary data transmitting unit 24 of the document data transmission device 12, and is received by the user terminal 14.

When the specific summary data is received by the user terminal 14, the client (user of the user terminal 14) is able to look up the summary data. The specific summary data includes the contents information of the specific document data corresponding to the specific summary data. Therefore, the client (user of the user terminal 14) is able to know which part (which page) of the specific document data contains the specific page data that the client (user of the user terminal 14) needs. In case of the document data being the patent publications, for example, the client (user of the user terminal 14) can easily recognize from which page through which page of the patent publications the detailed description of the invention is contained.

When the summary data is transmitted to the user terminal 14 from the summary data transmitting unit 24 of the document data transmission device 12, on the basis of the unit page data billing price charged to the transmission of unit data quantity of the page data and the unit summary data billing price charged to the transmission of unit data quantity of the summary data, the total billing amount charged to the transmission of the page data and the transmission of the summary data is calculated by the billing amount calculating unit 26 of the document data transmission device 12 (S20). Concretely, to the total billing amount charged to the transmission of the page data and the transmission of the summary data, which has been calculated up to the present, is added the billing amount (product of the summary data transmission quantity multiplied by the unit summary data billing price) charged to the transmission of the summary data at this time.

The client (user of the user terminal 14) who looked up the summary data transmitted to the user terminal 14 from the summary data transmitting unit 24 of the document data transmission device 12 inputs to the user terminal 14 the page data transmission request requesting to transmit the specific page data contained in the specific document data selected among the plural document data pieces stored in the storage unit 16 of the document data transmission device 12. The page data transmission request contains information for identifying the specific document data (name of the document data, or ID of the document data, for example), and information for identifying the specific page data (page number, for example). The specific document data pieces and the specific page data pieces may be one or plural. When the user knows in advance which part (which page) of the specific document data contains the specific page data, the step of the transmission reception of the summary data transmission request and the step of the transmission reception of the summary data become unnecessary.

The page data transmission request inputted to the user terminal 14 is transmitted from the user terminal 14 through the network 100 (S22), and received by the page data transmission receiving unit 18 of the document data transmission device 12 (S24).

When the page data transmission request is received by the page data transmission receiving unit 18 of the document data transmission device 12, on the basis of the page data transmission request received by the page data transmission receiving unit 18 of the document data transmission device 12, the specific page data contained in the specific document data is transmitted through a satellite network by the page data transmitting unit 20 of the document data transmission device 12 (S26), and is received by the user terminal 14 (S28). More concretely, first, the information for identifying the specific document data and the information for identifying the specific page data are looked up which are contained in the page data transmission request received by the page data transmission receiving unit 18 of the document data transmission device 12, and the specific page data contained in the specific document data is extracted among the plural document data pieces 16*a* stored in the storage unit 16 of the document data transmission device 12. The extracted specific page data contained in the specific document data is transmitted from the parabolic antenna 102 connected to the page data transmitting unit 20 through the satellite network. The specific page data transmitted from the parabolic antenna 102 is received by the parabolic antenna 106 connected to the user terminal 14 through the communication satellite 104.

Since the document data are transmitted by the unit of the page data, the client (user of the user terminal 14) is able to procure only the necessary page data efficiently and reasonably (without obtaining unnecessary pages). Further, since the document data is transmitted through a satellite network capable of high speed communication, the client (user of the user terminal 14) is able to procure the necessary page data in a short time.

When page data is transmitted to the user terminal 14 from the page data transmitting unit 20 of the document data transmission device 12, a total billing amount charged to the transmission of the page data and the transmission of the summary data is calculated by the billing amount calculating unit 26 of the document data transmission device 12, on the basis of the unit page data billing price charged to the transmission of the unit data quantity of the page data and the unit summary data billing price charged to the transmission of the unit data quantity of the summary data (S30). Concretely, to the total billing amount charged to the transmission of the page data and the transmission of the summary data, which has been calculated up to the present, is added the billing amount (product of the page data transmission quantity multiplied by the unit page data billing price) charged to the transmission of the page data at this time.

Here, the unit summary data billing price and the unit page data billing price are very different in the setting, more concretely, the unit summary data billing price is set extremely low compared to the unit page data billing price. Therefore, the client (user of the user terminal 14) is able to procure the summary data at a low cost, check up where the necessary page data are contained, and procure only the necessary page data with payment of a certain rate. Thus, the billing amount calculated by the billing amount calculating unit 26 will be very reasonable to the client (user of the user terminal 14).

Next, the function and effect of the document data transmission reception system relating to the embodiment will be described. The document data transmission reception system 10 relating to the embodiment receives a page data transmission request transmitted from the user terminal 14, requesting to transmit specific page data contained in specific document data by means of the page data transmission request receiving unit 18 of the document data transmission device 12, and transmits the specific page data (by the unit of page) to the user terminal 14 from the page data transmitting unit 20 of the document data transmission device 12. Therefore, when compared with the transmission of the whole document data to the user terminal 14, the system is able to efficiently transmit the page data to the user terminal 14 that the client (user of the user terminal 14) needs. Further, the document data transmission reception system 10 relating to the embodiment transmits the specific page data to the user terminal 14 through a satellite network. Therefore, when compared with the transmission of the specific page data through the network 100, for example, the Internet, the system is able to transmit the specific page data to the user terminal 14 in a short time. That is, the document data transmission reception system 10 relating to the embodiment is able to swiftly transmit the information that the client (user of the user terminal 14) needs.

Further, the document data transmission reception system 10 relating to the embodiment receives a summary data transmission request transmitted from the user terminal 14, requesting to transmit specific summary data by means of the summary data transmission request receiving unit 22 of the document data transmission device 12, and transmits the specific summary data to the user terminal 14 from the summary data transmitting unit 24 of the document data transmission device 12. Therefore, the system is able to inform the client (user of the user terminal 14) of which part (which page) of the specific document data contains the specific page data. As the result, the client (user of the user terminal 14) is able to easily recognize where the necessary information is contained, thus enhancing the serviceability of the document data transmission reception system 10.

Further, the document data transmission reception system 10 relating to the embodiment calculates a billing amount on the basis of the unit page data billing price and the unit summary data billing price, by means of the billing amount calculating unit 26 of the document data transmission device 12. Therefore, when compared with setting a uniform unit billing price regardless of the transmission of a page data or the transmission of summary data, a more flexible billing system can be organized, for example, a system such that the unit summary data billing price can be set low in comparison with the unit page data billing price. As the result, the system enhances the serviceability as to the billing (or charge) system to both the users and the providers of the document data transmission service.

The document data transmission reception system 10 relating to the embodiment, when requesting the transmission of a summary data, transmits information for identifying the specific summary data (name of the summary data, ID of the summary data, name of the corresponding document data, or ID of the corresponding document data, for example). However, considering that the specific summary data is not obtained, the system may also include the keyword retrieval function and full text retrieval function. In the same manner, it may also include the keyword retrieval function and full text retrieval function with regard to the page data.

In the document data transmission reception system 10 relating to the embodiment, the contents information of the summary data pieces 16b contains information showing that which page contains what contents of information (for example, the claims are contained in the first to second pages). However, the contents information may also include information showing the start page of a specific contents information (the claims: first page to . . . , for example).

Figure 5:
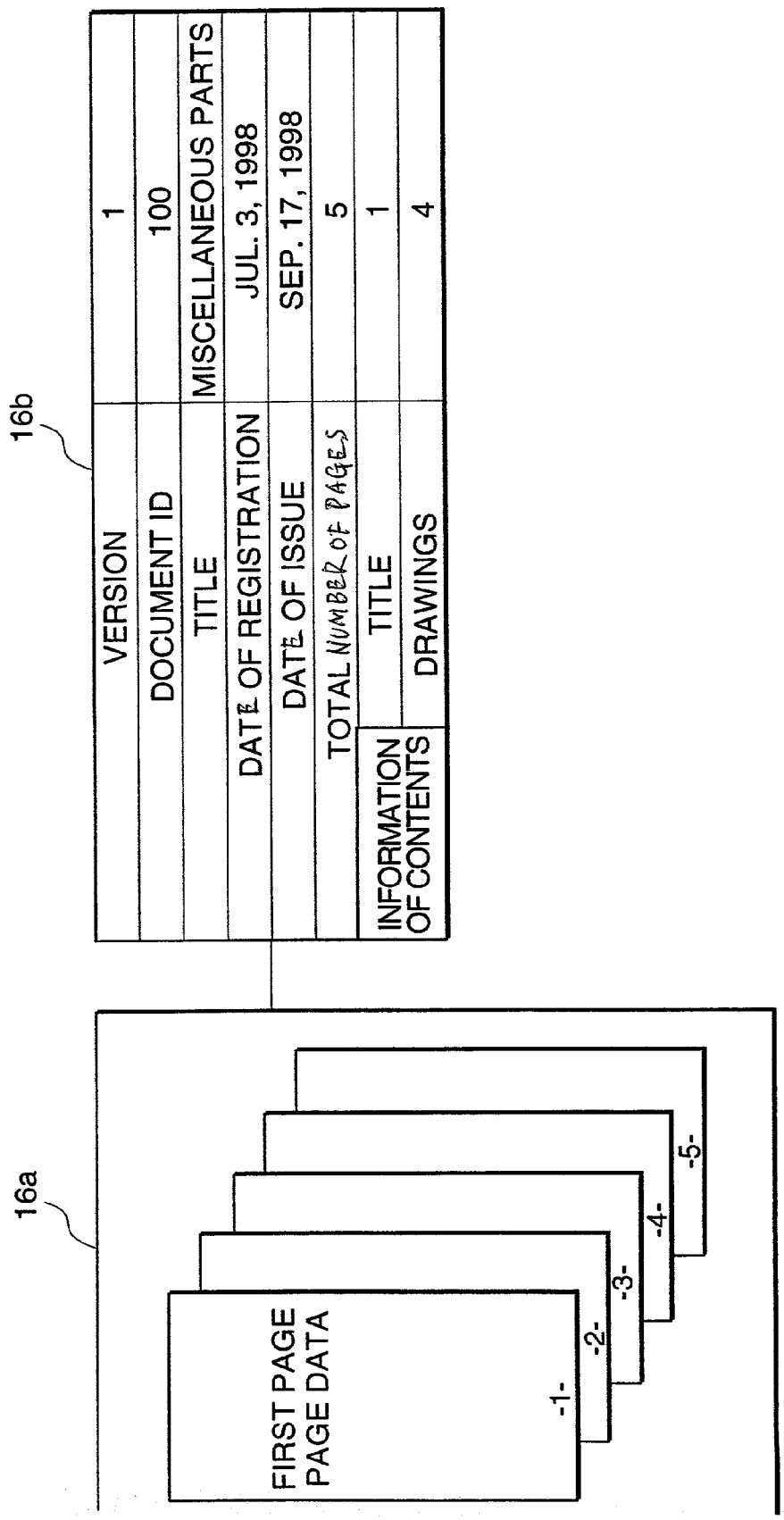
FIG. 5 is a chart illustrating a configuration of other document data and summary data.

In the document data transmission reception system 10 relating to the embodiment, the system that executes transmission reception of the patent publications is on the assumption. However, the document data transmission reception system according to the invention is applicable to a document data transmission reception system that transmits and receives any document data. For example, the document data transmission reception system according to the invention is applicable to a document data transmission reception system that transmits and receives a maintenance manual of an aircraft as the document data. In this case, the configuration of the document data pieces 16a and the summary data pieces 16b will be as shown in FIG. 5. As shown in FIG. 5, the plural document data pieces 16a each contain one or plural page data pieces (five page data pieces, in FIG. 5). The summary data pieces 16b are made one by one in correspondence with each of the plural document data pieces 16a (namely, the number of the summary data pieces 16b is equal to the number of the document data pieces 16a). The summary data pieces 16b contain the contents information of the corresponding document data pieces 16a. In case the document data pieces 16a is the maintenance manual as shown in FIG. 5, more concretely, the summary data pieces 16b contains a version, document ID being the identification number of the document data, title, date of registration, date of issue, total number of pages, and contents information. Here, the contents information as shown in FIG. 5 shows that the title is contained in the first page and the drawings are contained in the fourth page.

The document data transmission device, the document data transmission reception system, and the document data transmission method according to the invention receive a page data transmission request transmitted from a user terminal, requesting to transmit specific page data contained in a specific document data, and transmit the specific page data to the user terminal. Therefore, in comparison with transmitting the whole document data to the user terminal, the server, the system, and the method according to the invention are able to efficiently transmit the specific page data to the user terminal that the client (user of the user terminal) needs. Further, the server, the system, and the method according to the invention transmit the specific page data to the user terminal through a satellite network. Therefore, in comparison with transmitting the specific page data to the user terminal through the Internet, the server, the system, and the method according to the invention are able to transmit the specific page data to the user terminal in a short time. As the result, the server, the system, and the method according to the invention are able to swiftly transmit the information that the client (user of the user terminal) needs.

Further, the document data transmission device, the document data transmission reception system, and the document data transmission method according to the invention receive a summary data transmission request transmitted from the user terminal, requesting to transmit specific summary data, and transmit the specific summary data to the user terminal. Thereby, the server, the system, and the method according to the invention are able to inform the client (user of the user terminal) of which part (which page) of the specific document data contains the specific page data. As the result, the client (user of the user terminal) is able to easily recognize where the necessary information is contained, thus enhancing the serviceability.

Further, the document data transmission device, the document data transmission reception system, and the document data transmission method according to the invention calculate a billing amount on the basis of the unit page data billing price and the unit summary data billing price. Therefore, when compared with setting a uniform unit billing price regardless of the transmission of page data or the transmission of summary data, a more flexible billing system can be organized, for example, a system such that the unit summary data billing price can be set low in comparison with the unit page data billing price. As the result, with regard to the billing (or charge) system is enhanced the serviceability to both the users and the providers of the document data transmission service.

The entire disclosure of Japanese Patent Application No. 2000-162933 filed on May 31, 2000 including specification, claims, drawings and abstract is incorporated herein by reference in its entirety.

What is claimed is:

1. A document data transmission device comprising:
   storage means for storing plural documents including plural pages;
   the storage means further storing plural summary data corresponding to the plural documents, each summary data including contents information showing which page contains what contents of information:
   page data transmission request receiving means for receiving a page data transmission request transmitted from a user terminal, requesting to transmit a specific page contained in a specific document selected among the plural documents stored in the storage means;
   page data transmitting means for transmitting the specific page contained in the specific document to the user terminal, on the basis of the page data transmission request received by the page data transmission request receiving means;
   summary data transmission request receiving means for receiving summary data transmission request transmitted from the user terminal, requesting to transmit a specific summary data selected among the plural summary data stored in the storage means;
   summary data selecting means for identifying and extracting the requested specific summary data among the plurality of summary data stored in the storage means based on the summary data transmission request; and
   summary data transmitting means for transmitting the requested specific summary data to the user terminal, on the basis of the summary data transmission request received by the summary data transmission request receiving means, wherein the user terminal displays the specific summary data so that a user can select the specific page that includes contents of information of interest to the user.

2. The document data transmission device of claim 1, wherein each page corresponds to at least one of data to be printed out on a single sheet of recording paper and data to be viewed on a single screen of a display.

3. The document data transmission device of claim 1, wherein the page data includes at least one of text data and picture data.

4. A document data transmission device according to claim 1, further comprising:
   billing amount calculating means for calculating a billing amount charged to a transmission of the specific page and to a transmission of the summary data, on the basis of a unit price charged to a transmission of a unit data quantity of the specific page and a unit price charged to a transmission of a unit data quantity of the summary data.

5. A document data transmission reception system comprising:
   the document data transmission device according to claim 1; and
   a user terminal for transmitting a page data transmission request requesting to transmit the specific page to the document data transmission device through a ground-based network and receiving the specific page transmitted from the document data transmission device through a satellite network.

6. A document data transmission reception system comprising:
   the document data transmission device according to claim 1; and
   a user terminal for transmitting a summary data transmission request requesting to transmit the specific summary data to the document data transmission device, and receiving the specific summary data transmitted from the document data transmission device.

7. A document data transmission method for transmitting document data from a document data transmission device having storage means for storing plural documents including plural pages, the storage means further stores plural summary data corresponding to each of the plural documents, each summary data including contents information showing which page contains what contents of information, the method comprising:
   receiving a page data transmission request transmitted from a user terminal, requesting to transmit a specific page contained in specific document selected among the plural documents stored in the storage means;
   transmitting the specific page contained in the specific document to the user terminal, on the basis of the received page data transmission request;
   receiving a summary data transmission request transmitted from the user terminal, requesting to transmit specific summary data selected among the plural summary data stored in the storage means;
   identifying and extracting the requested specific summary data among the plurality of summary data stored in the storage means based on the summary data transmission request; and
   transmitting the requested specific summary data to the user terminal, on the basis of the received summary data transmission request, wherein the user terminal displays the specific summary data so that a user can select the specific page that includes contents of information of interest to the user.

8. A document data transmission method according to claim 7, further comprising:
   calculating a billing amount charged to a transmission of the specific page and to a transmission of the summary data, on the basis of a unit price charged to a transmission of a unit data quantity of the specific page and a unit price charged to a transmission of a unit data quantity of the summary data.

9. A document data transmission system comprising:
   storage means for storing plural documents including one or plural pages and plural summary data including contents information of each of the plural document data pieces,
   a user terminal for transmitting a page data transmission request requesting to transmit a specific page to the document data transmission device through a ground-based network,
   page data transmission request receiving means for receiving the page data transmission request transmitted from a user terminal, requesting to transmit specific page data contained in specific document data selected among the plural document data pieces stored in the storage means
   summary data selecting means for identifying and extracting the requested specific summary data among the plurality of summary data stored in the storage means based on the summary data transmission request; and,
   page data transmitting means for transmitting the specific page data contained in the specific document data to the user terminal through a satellite network, on the basis of the page data transmission request received by the page data transmission request receiving means.

10. A document data transmission system of claim 9, further comprising:

summary data transmission request receiving means for receiving a summary data transmission request transmitted from the user terminal, requesting to transmit specific summary data selected among the plural summary data pieces stored in the storage means, and summary data transmitting means for transmitting the specific summary data to the user terminal, on the basis of the summary data transmission request received by the summary data transmission request receiving means.

11. The document data transmission reception system of claim 5, wherein the ground-based network comprises the Internet.

* * * * *